United States Patent
Fang et al.

(10) Patent No.: US 11,958,966 B2
(45) Date of Patent: Apr. 16, 2024

(54) LOW-DENSITY PVC PLASTICS FLOORING AND PREPARATION METHOD THEREOF

(71) Applicant: Zhejiang Tianzhen Technology Co., Ltd., Zhejiang (CN)

(72) Inventors: Qinghua Fang, Zhejiang (CN); Wenjin Tang, Zhejiang (CN)

(73) Assignee: Zhejiang Tianzhen Technology Co., Ltd., Huzhou (CN)

( * ) Notice: Subject to any disclaimer, the term of this patent is extended or adjusted under 35 U.S.C. 154(b) by 0 days.

(21) Appl. No.: 17/830,545

(22) Filed: Jun. 2, 2022

(65) Prior Publication Data

US 2023/0203294 A1 Jun. 29, 2023

(30) Foreign Application Priority Data

Dec. 29, 2021 (CN) .......................... 202111632931.X

(51) Int. Cl.
*C08L 27/06* (2006.01)
*E04F 15/00* (2006.01)

(52) U.S. Cl.
CPC .............. *C08L 27/06* (2013.01); *E04F 15/00* (2013.01); *C08L 2201/08* (2013.01); *C08L 2203/14* (2013.01)

(58) Field of Classification Search
CPC ................................. C08L 27/06; E04F 15/00
See application file for complete search history.

(56) References Cited

U.S. PATENT DOCUMENTS

2022/0203664 A1* 6/2022 Song ...................... B29C 44/20

FOREIGN PATENT DOCUMENTS

CN 108609913 A * 10/2018 ............. B28B 3/224
CN 112793268 A * 5/2021 ............. B29C 44/20

OTHER PUBLICATIONS

English Machine Translation of CN112793268 ( A1 ) obtained on Nov. 1, 2023 https://worldwide.espacenet.com/publicationDetails/biblio?CC=CN&NR=112793268A&KC=A&FT=D&ND=3&date=20210514&DB=EPODOC&locale=en_EP (Year: 2021).*

English Machine Translation of CN108609913 ( A ) obtained on Nov. 1, 2023 https://worldwide.espacenet.com/publicationDetails/biblio?CC=CN&NR=108609913A&KC=A&FT=D&ND=3&date=20181002&DB=&locale=en_EP (Year: 2018).*

* cited by examiner

*Primary Examiner* — Ling Siu Choi
*Assistant Examiner* — Olga Lucia Donahue
(74) *Attorney, Agent, or Firm* — Kirk A. Wilson; Joseph T. Guy; Patent Filing Specialist Inc.

(57) ABSTRACT

The disclosure provides a low-density PVC plastics flooring and a preparation method thereof, which belongs to the technical field of films for floor. The disclosure provides a low-density PVC plastics flooring, which is prepared from components including, in parts by mass, 100 parts of PVC, 300-380 parts of calcium carbonate, 7-12 parts of a stabilizer, 2-8 parts of processing aid ACR, 12-16 parts of a foaming regulator, 0.1-0.5 parts of a foaming agent, 2-4 parts of G60 lubricant, and 2-4 parts of PE wax. In the disclosure, the density of the PVC plastics flooring is reduced to 1.4-1.6 g/cm$^3$ even increasing the amount of calcium carbon, thereby greatly reducing the production cost and improving the economic efficiency.

9 Claims, No Drawings

LOW-DENSITY PVC PLASTICS FLOORING AND PREPARATION METHOD THEREOF

CROSS REFERENCE TO RELATED APPLICATION

This patent application claims the benefit and priority of Chinese Patent Application No. 202111632931.X filed on Dec. 29, 2021, the disclosure of which is incorporated by reference herein in its entirety as part of the present application.

TECHNICAL FIELD

The present disclosure relates to the technical field of films for floor, in particular to a low-density PVC plastics flooring and a preparation method thereof.

BACKGROUND ART

PVC plastics flooring is a very popular new lightweight floor decoration material in the world, also known as "a lightweight floor material". It has been widely accepted at home and abroad, and widely used in various venues such as home, hospitals, schools, office buildings, factories, public places, supermarkets, and businesses. The PVC plastics flooring refers to the floor made from polyvinyl chloride (PVC) materials. Specifically, the PVC plastics flooring is produced by using PVC and a copolymer resin thereof as main raw materials, adding auxiliary materials such as fillers, plasticizers, stabilizers, and colorants thereto, and subjecting the resulting mixture to a coating, calendaring, extrusion, or squeeze process on a continuous sheet-like substrate.

However, in the prior art, the PVC plastics flooring prepared using high content of calcium carbonate has a density of not less than 2.1 g/cm$^3$, which involves an issue of high density.

SUMMARY

In view of the above, an object of the present disclosure is to provide a low-density PVC plastics flooring and a preparation method thereof. The PVC plastics flooring according to the present disclosure has a low density, which helps to reduce the transport cost.

In order to achieve the above object of the present disclosure, the present disclosure provides the following technical solutions:

The present disclosure provides a low-density PVC plastics flooring, which is prepared from components comprising, in parts by mass,
    100 parts of PVC, 300-380 parts of calcium carbonate, 7-12 parts of a stabilizer, 2-8 parts of processing aid ACR, 12-16 parts of a foaming regulator, 0.1-0.5 parts of a foaming agent, 2-4 parts of G60 lubricant, and 2-4 parts of PE wax.

In some embodiments, the low-density PVC plastics flooring is prepared from components comprising, in parts by mass,
    100 parts of PVC, 350 parts of calcium carbonate, 9 parts of the stabilizer, 6 parts of the processing aid ACR, 14 parts of the foaming regulator, 0.3 parts of the foaming agent, 2.2 parts of the G60 lubricant, and 2.5 parts of the PE wax.

In some embodiments, the stabilizer is a calcium zinc stabilizer.

In some embodiments, the foaming regulator is PVC foaming regulator ACR.

In some embodiments, the foaming agent is AC foaming agent.

The present disclosure further provides a method for preparing the low-density PVC plastics flooring as described in the above technical solutions, comprising the following steps:
    mixing PVC, calcium carbonate, the stabilizer, the processing aid, the foaming regulator, the foaming agent, the G60 lubricant, and the PE wax, subjecting the resulting mixture to a melt extrusion, a sizing, a calendering-forming film, and an on-line embossing in sequence, to obtain the low-density PVC plastics flooring.

In some embodiments, the melt extrusion temperature is in the range of 160-240° C.

The present disclosure provides a low-density PVC plastics flooring, which is prepared from components comprising, in parts by mass,
    100 parts of PVC, 300-380 parts of calcium carbonate, 7-12 parts of the stabilizer, 2-8 parts of the processing aid ACR, 12-16 parts of the foaming regulator, 0.1-0.5 parts of the foaming agent, 2-4 parts of G60 lubricant, and 2-4 parts of PE wax.

In the present disclosure, by controlling the precise amount of the stabilizer, the processing aid ACR, the foaming regulator, the foaming agent, the G60 lubricant, and the PE wax, the foaming process in the preparation process of the low-density PVC plastics flooring is optimized, and a special cellular structure is formed. Thus, the density of the PVC plastics flooring is reduced to 1.5 g/cm$^3$ even under the condition of increased amount in calcium carbonate, thereby greatly reducing the production cost and improving the economic efficiency. In addition, the foaming process could be optimized by using the formulation of the low-density PVC plastics flooring according to the present disclosure, thereby achieving a sound insulation effect.

The present disclosure further provides a method for preparing the low-density PVC plastics flooring according to the above technical solutions. The method according to the present disclosure is simple, quick, and has few steps, which is beneficial to realizing industrialized production.

DETAILED DESCRIPTION OF THE EMBODIMENTS

The present disclosure provides a low-density PVC plastics flooring, which is prepared from components comprising the following parts by mass:
    80-120 parts of PVC, 340-360 parts of calcium carbonate, 7-12 parts of a stabilizer, 4-8 parts of processing aid ACR, 12-16 parts of a foaming regulator, 0.1-0.5 parts of a foaming agent, 2-4 parts of G60 lubricant, and 2-4 parts of PE wax.

In the present disclosure, unless otherwise specified, the raw materials used are all commercially available products in the field.

In some embodiments, the low-density PVC plastics flooring according to the present disclosure comprises 100 parts by mass of PVC.

In relative to the parts by mass of the PVC, the low-density PVC plastics flooring comprises 340-360 parts by mass of calcium carbonate, preferably 345-355 parts, and more preferably 350 parts.

In some embodiments of the present disclosure, a mass ratio of PVC to calcium carbonate is in the range of 1:3-4, and preferably 1:3.5.

In relative to the parts by mass of the PVC, the low-density PVC plastics flooring comprises 7-12 parts by mass of stabilizer, and preferably 8-10 parts.

In some embodiments of the present disclosure, the stabilizer is a calcium zinc stabilizer. In some embodiments, the heat stabilizer is calcium stearate.

In relative to the parts by mass of the PVC, the low-density PVC plastics flooring comprises 2-8 parts by mass of the processing aid ACR, and preferably 5-7 parts. In some embodiments, the processing aid ACR is HF-901 produced by Shandong Hongfu Chemical Co., Ltd. China. The processing aid ACR is used to plasticize and improve fluidity.

In relative to the parts by mass of the PVC, the low-density PVC plastics flooring comprises 12-16 parts by mass of the foaming regulator, and preferably 13-15 parts. In some embodiments, the foaming regulator is NH600A produced by Zhejiang Joysun Advanced Material Co. Ltd. China. The foaming regulator is used to adjust the foaming performance. In some embodiments of the present disclosure, the foaming regulator is PVC foaming regulator ACR.

In relative to the parts by mass of the PVC, the low-density PVC plastics flooring comprises 0.1-0.5 parts by mass of the foaming agent, and preferably 0.2-0.4 parts. In some embodiments of the present disclosure, the foaming agent is AC foaming agent.

In relative to the parts by mass of the PVC, the low-density PVC plastics flooring comprises 2-4 parts by mass of G60 lubricant, and preferably 2.2-3 parts.

In relative to the parts by mass of the PVC, the low-density PVC plastics flooring comprises 2-4 parts by mass of PE wax, and preferably 2.5-3 parts.

In some embodiments of the present disclosure, the low-density PVC plastics flooring is prepared from components comprising, in parts by mass,
100 parts of PVC, 350 parts of calcium carbonate, 9 parts of the stabilizer, 6 parts of the processing aid ACR, 14 parts of the foaming regulator, 0.3 parts of the foaming agent, 2.2 parts of the G60 lubricant, and 2.5 parts of the PE wax.

The present disclosure further provides a method for preparing the low-density PVC plastics flooring according to the above technical solutions, comprising the steps of:
mixing PVC, calcium carbonate, the stabilizer, the processing aid, the foaming regulator, the foaming agent, the G60 lubricant, and the PE wax, and subjecting the resulting mixture to a melt extrusion, a sizing, a calendering-forming film, and an on-line embossing in sequence to obtain the low-density PVC plastics flooring.

In some embodiments, the melt extrusion temperature is in the range of 160-240° C.

In the present disclosure, there is no particular limitation on the specific means for the sizing, the calendering-forming film, and the on-line embossing, and any means well known to those skilled in the art may be used.

In order to further illustrate the present disclosure, the low-density PVC plastics flooring and its preparation method according to the present disclosure will be described in detail below in conjunction with examples, but they should not be understood as limiting the protection scope of the present disclosure.

Examples

The materials for the preparation of the low-density PVC plastics flooring in Examples 1 to 3 are shown in Table 1.

TABLE 1

Materials for the preparation of the low-density PVC plastics flooring in Examples 1 to 3

| | PVC | Calcium carbonate | Stabilizer | Processing aid ACR | Foaming regulator ACR | AC foaming agent | G60 lubricant | PE wax |
|---|---|---|---|---|---|---|---|---|
| Example 1 | 100 | 300 | 7 | 2 | 12 | 0.1 | 2 | 2 |
| Example 2 | 100 | 380 | 12 | 8 | 16 | 0.5 | 4 | 4 |
| Example 3 | 100 | 350 | 9 | 6 | 14 | 0.3 | 2.2 | 2.5 |

The low-density PVC plastics flooring of Examples 1 to 3 were prepared according to the following processes:
PVC, calcium carbonate, the stabilizer, the processing aid ACR, the foaming regulator ACR, the AC foaming agent, G60 lubricant, and PE wax were mixed. The resulting mixture was subjected to a melt extrusion (with a temperature of 160° C.), a sizing, a calendering-forming film, and an on-line embossing in sequence, obtaining low-density PVC plastics flooring.

The low-density PVC plastics flooring prepared in Examples 1 to 3 were subjected to a density test. The densities of the low-density PVC plastics flooring prepared in Examples 1 to 3 were measured as 1.75 g/cm$^3$, 1.8 g/cm$^3$, and 1.5 g/cm$^3$, respectively. The low-density PVC plastics flooring prepared in Examples 1 to 3 were subjected to a hardness test. The hardnesses of the low-density PVC plastics flooring prepared in Examples 1 to 3 were 85 D, 88 D, and 90 D, respectively.

Comparative Example

In parts by mass, 100 parts of PVC, 350 parts of calcium carbonate, 9 parts of the stabilizer, 6 parts of the processing aid ACR, 2.2 parts of G60 lubricant, and 2.5 parts of PE wax were mixed. The resulting mixture was subjected to a melt extrusion (with a temperature of 160° C.), a sizing, a calendering-forming film, and an on-line embossing in sequence, obtaining a PVC plastics flooring.

The PVC plastics flooring obtained in this comparative example had a density of 2.15 g/cm$^3$ and hardness of 89 D.

The above descriptions are only preferred embodiments of the present disclosure, and are not intended to make any limitation to the present disclosure. It should be noted that the improvements and the embellishments without departing from the principle of the present disclosure shall be within the protection scope of the present disclosure for those of ordinary skill in the art.

What is claimed is:

1. A polyvinyl chloride plastic flooring, which is prepared from components consisting of, in parts by mass,
    100 parts of polyvinyl chloride, 300-380 parts of calcium carbonate, 7-12 parts of a stabilizer, 2-8 parts of processing aid acrylic ester copolymer, 12-16 parts of a foaming regulator, 0.1-0.5 parts of a foaming agent, 2-4 parts of decanedioic acid oleic alcohol ester lubricant, and 2-4 parts of polyethylene wax,
    wherein the polyvinyl chloride plastic flooring has a density less than 2.1 g/cm$^3$.

2. The polyvinyl chloride plastic flooring as claimed in claim 1, wherein the polyvinyl chloride plastic flooring is prepared from components consisting of, in parts by mass,
    100 parts of the polyvinyl chloride, 350 parts of the calcium carbonate, 9 parts of the stabilizer, 6 parts of the processing aid acrylic ester copolymer, 14 parts of the foaming regulator, 0.3 parts of the foaming agent, 2.2 parts of the decanedioic acid oleic alcohol ester lubricant, and 2.5 parts of the polyethylene wax.

3. The polyvinyl chloride plastic flooring as claimed in claim 2, wherein the stabilizer is a calcium stabilizer.

4. The polyvinyl chloride plastic flooring as claimed in claim 2, wherein the foaming regulator is polyvinyl chloride foaming regulator acrylic ester copolymer.

5. The polyvinyl chloride plastic flooring as claimed in claim 2, wherein the foaming agent is azodicarbonamide foaming agent.

6. The polyvinyl chloride plastic flooring as claimed in claim 1, wherein the stabilizer is a calcium stabilizer.

7. The polyvinyl chloride plastic flooring as claimed in claim 1, wherein the foaming regulator is polyvinyl chloride foaming regulator acrylic ester copolymer.

8. The polyvinyl chloride plastic flooring as claimed in claim 1, wherein the foaming agent is azodicarbonamide foaming agent.

9. The polyvinyl chloride plastic flooring as claimed in claim 1, wherein the polyvinyl chloride plastic flooring has a density of 1.4 to 1.6 g/cm$^3$.

* * * * *